C. W. DICE.
FISHING TACKLE.
APPLICATION FILED AUG. 8, 1919.
1,362,765.
Patented Dec. 21, 1920.
2 SHEETS—SHEET 2.
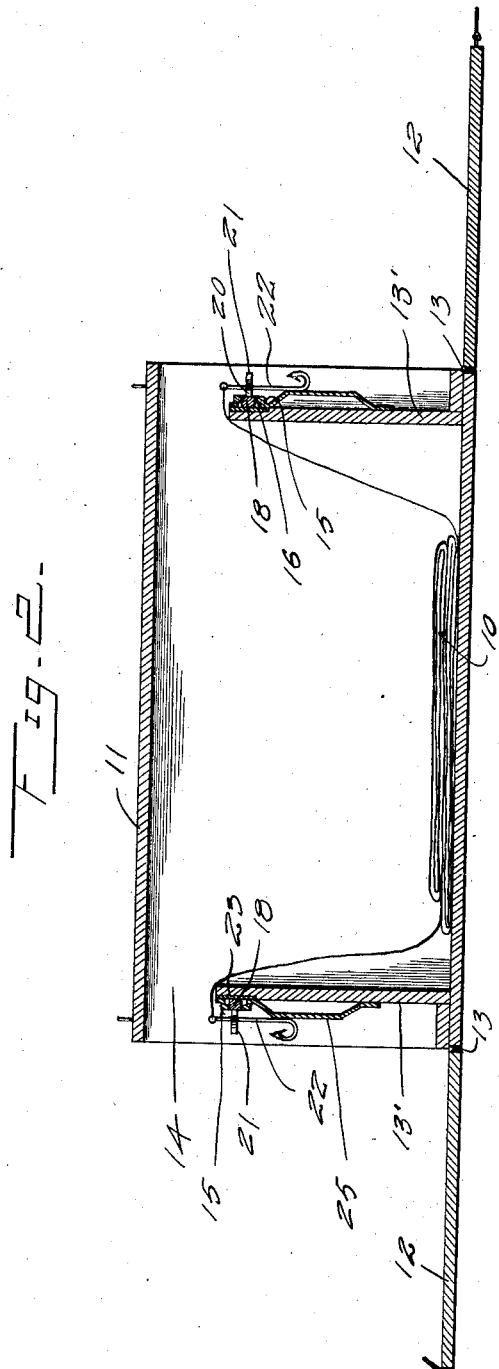
Inventor
C. W. Dice
By [signature] Atty.

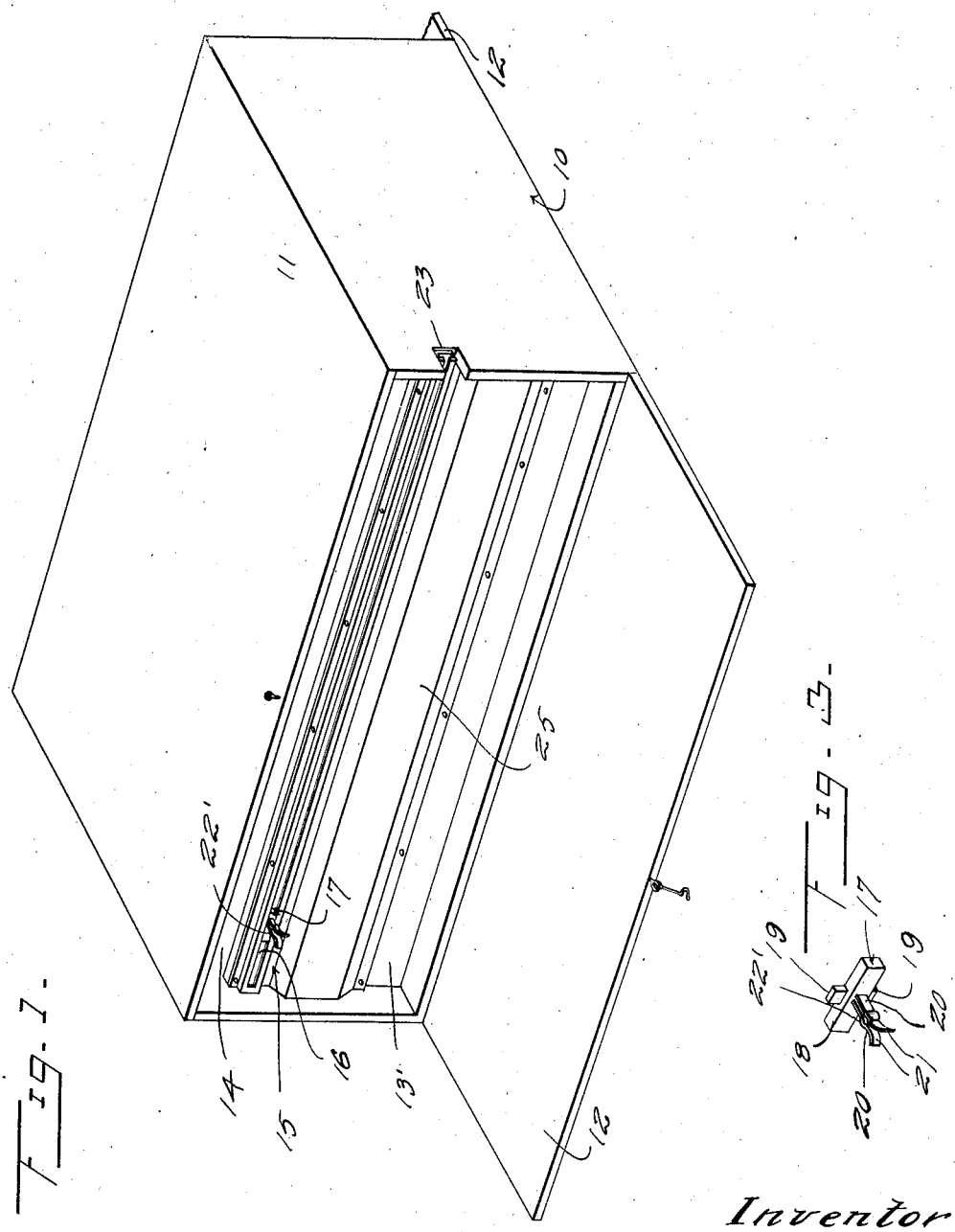

UNITED STATES PATENT OFFICE.

CHARLES W. DICE, OF DANVILLE, ILLINOIS.

FISHING-TACKLE.

1,362,765.  Specification of Letters Patent.  Patented Dec. 21, 1920.

Application filed August 8, 1919. Serial No. 316,131.

*To all whom it may concern:*

Be it known that I, CHARLES W. DICE, a citizen of the United States, residing at Danville, in the county of Vermilion and State of Illinois, have invented certain new and useful Improvements in Fishing-Tackle; and I do hereby declare the following to be a full, clear, and exact description of the invention, such as will enable others skilled in the art to which it appertains to make and use the same.

My invention relates to improvements in fishing tackle and more particularly to means for supporting fishing lines and hooks.

An important object of this invention is to provide means to detachably support a plurality of fishing hooks and lines to permit the same to be readily dispensed as the boat in which the hooks are carried progresses.

A further object of the invention is to provide means for detachably supporting a fishing line having a plurality of hooks whereby the hooks may be baited before leaving shore.

A further object of the invention is to provide means for detachably supporting a fishing line and the hooks therefor whereby the line and hooks are prevented from becoming entangled.

A further object is to provide a casing having novel means for conveniently and expeditiously supporting and dispensing fishing lines.

Other objects and advantages will be apparent during the course of the following description.

In the accompanying drawings forming a part of this application and in which like numerals are employed to designate like parts throughout the same, Figure 1 is a perspective of a casing and hook supporting means embodying the invention, Fig. 2 is a transverse section through the same, Fig. 3 is a perspective of the catch shown in Fig. 1.

In the drawings wherein for the purpose of illustration is shown the preferred embodiments of my invention, the numeral 10 generally designates a casing which may be rectangular in shape. The upper side of the casing 10 is provided with a cover or top 11. The longitudinal vertical sides 12 are horizontally hinged to the lower side of the casing by hinges 13 and are adapted to be swung downwardly to expose the hook supporting means. Stationary side walls 13' are arranged inwardly of the hinged sides 12 and are spaced therefrom as clearly indicated in Fig. 2. The stationary side walls 13' have their upper longitudinal edges terminating below the cover 11 to provide an opening 14 through which the fishing line may pass. A metallic plate generally designated by the numeral 15 is secured to the upper portion of the stationary side walls 13' and is provided with a longitudinally extending opening 16 opening out through one end of the same. A plurality of hook supporting members generally designated by the number 17 are slidably arranged in the slot or opening 16.

Each hook supporting member 17 includes a rectangular head 18 arranged within the slot 16 and provided with a pair of laterally extending flanges or retaining elements 19 engaging the inner sides of the metallic plate. A pair of spring arms 20 extend outwardly from the head 18 and have their outer end portions diverging outwardly as indicated at 21 for forming guideways for hooks 22 which are adapted to be received within opposed recessed portions 22' in the arms 20. An elongated metallic plate 23 of relative thin construction is arranged rearwardly of the metallic plate or guide 15 and abuts the flanges 19 to retain the hook supporting members 17 in position.

Any number of hook supporting members 17 may be carried by the guide or support 15 and they may be arranged any distance apart. An inclined member 25 is arranged at the lower side of the slot 16 and serves to expedite the removal of the hooks from the hook supporting members.

In the use of my invention, the hook supporting members are arranged on the outer sides of the stationary side walls 13' adjacent the openings 14. Upon arranging the fishing line within the casing, the same is placed within the casing with the hooks in engagement with the hook supporting members. When it is desired to dispense the line and the hooks, the hooks are removed from engagement with the hook supporting members and drawn out of the casing as is obvious.

As indicated in Fig. 2 the line placed in the case 10 from one side is arranged upon the line placed in the case from the other side and the line which is the last to be placed into the case is the first to be removed.

While I have shown and described the preferred embodiment of my invention, it is understood that minor changes may be made in the arrangement and construction of parts, provided such changes remain within the spirit of the invention of what is claimed.

Having thus described my invention, what I claim is:—

1. An apparatus of the character described including a casing having stationary side walls spaced inwardly from the edges of the casing and terminating below the top of the same for providing longitudinally extending openings, hinged covers adapted to be arranged over said stationary side walls, and hook supporting members carried by said stationary side walls adjacent the upper edges of the same.

2. An apparatus of the character described including a casing having stationary side walls spaced inwardly from the longitudinal sides of the same and terminating short of the upper edge of the casing for providing openings, metallic plates carried by said stationary side walls adjacent said openings, and having slots opening out through one of their ends, and hook supporting members extending through said slots.

3. The construction set forth in claim 2, and plates arranged rearwardly of said first named metallic plates, and engaging said hook supporting members for retaining the same in position.

4. The construction set forth in claim 2, and covers horizontally hinged to the sides of the casing and adapted to be arranged over said inwardly disposed side walls.

5. The construction set forth in claim 2, and inclined plates arranged below the openings in said first named plates and adapted for engaging said hooks.

6. An apparatus of the character described including a casing, metallic plates carried by the sides of the casing and having slots opening out through one of their ends, hook supporting members slidably arranged in said slots and including rectangular heads and spring arms extending from the heads.

7. An apparatus of the character described including a support, a metallic plate carried by the support and having a longitudinally extending slot opening out through one end thereof, hook engaging members extending through said slot, and including heads and spring arms having their outer end portions diverging outwardly, and means to retain said hook engaging members in position.

8. A device of the character described including an elongated plate having a slot extending out through one end thereof, a plurality of hook engaging members arranged in said slot and including rectangular heads, outwardly diverging arms and laterally projecting flanges carried by the heads, and means to secure said hook engaging members in position.

In testimony whereof I affix my signature in presence of two witnesses.

CHARLES W. DICE.

Witnesses:
 FRED M. HESS,
 F. R. PUTMAN.